United States Patent [19]

Mueller et al.

[11] 4,211,089
[45] Jul. 8, 1980

[54] HEAT PUMP WRONG OPERATIONAL MODE DETECTOR AND CONTROL SYSTEM

[75] Inventors: Dale A. Mueller, St. Paul; Stephen L. Serber, New Hope, both of Minn.

[73] Assignee: Honeywell Inc., Minneapolis, Minn.

[21] Appl. No.: 964,221

[22] Filed: Nov. 27, 1978

[51] Int. Cl.² .................... F25B 13/00; F25B 41/00; F25B 49/00

[52] U.S. Cl. .................................... 62/209; 62/160; 62/126; 62/131

[58] Field of Search ............... 62/160, 126, 208, 209, 62/228 R, 127, 131, 324 R

[56] References Cited

U.S. PATENT DOCUMENTS

| | | | |
|---|---|---|---|
| 2,988,896 | 6/1961 | Swart, Jr. | 62/209 |
| 2,988,897 | 6/1961 | McGrath | 62/209 |
| 3,097,502 | 7/1963 | Krueger | 62/209 |
| 3,170,304 | 2/1965 | Hale | 62/209 |

Primary Examiner—William E. Wayner
Assistant Examiner—Harry Tanner
Attorney, Agent, or Firm—Roger W. Jensen

[57] ABSTRACT

An improper or wrong operational mode fault detection and control system for a reverse cycle refrigeration system for detecting faulty operation, i.e., operation in the cooling mode when heating is desired or in the heating mode when cooling is requested, and for controlling the system in response to the detection of a fault by inhibiting the compressor and for providing a fault indication, the control system comprising a controller means receiving inputs indicative of the outdoor air temperature, the temperature of the outdoor heat exchanger coil refrigerant, and an output indicative of a demand from a building temperature sensing means for heating or cooling of the building. The controller means also includes timing means and means for comparing the value of the outdoor heat exchanger coil refrigerant temperature and the value of the outdoor air temperature. Further, the controller means has an operative connection to control means for controlling the operation of the compressor and functioning to inhibit any further operation of the compressor means unless the value of the difference between the temperature of the outdoor heat exchanger refrigerant and the temperature of the outdoor air is less than a first preselected value when the thermostat requests heating, and unless said difference exceeds a second preselected value when the thermostat requests cooling.

6 Claims, 5 Drawing Figures

HEAT PUMP WRONG OPERATIONAL MODE DETECTOR AND CONTROL SYSTEM

BACKGROUND OF THE INVENTION

One of the significant problems with heat pumps is that occasionally the reversing valve may fail to change from heating to cooling, or from cooling to heating, when commanded by the system controls. Accordingly, the heat pump may be providing cooling to the controlled space, e.g., building, when heating of same is required or be providing heating when cooling is required; this type of malfunction may waste energy and may damage the heat pump system. Accordingly, prior art technology identifies the relationship between the heating or cooling mode of operation of the heat pump and the difference between the outdoor heat exchanger coil refrigerant temperature and the outdoor air temperature, and various prior art schemes protect the heat pump from potentially damaging excessive pressures resulting from, for example, attempting to provide cooling for the controlled space when the outdoor temperature is cooler than would be normal for cooling operation; however, all of these prior art arrangements have shortcomings in that they fail to respond to this type of failure of the heat pump system until damage to the heat pump system components is imminent, without attending to the problem of wasting energy.

For example, one prior art scheme monitors the pressure of the refrigerant at the discharge side of the compressor and inhibits the compressor operation when said pressure exceeds a predetermined value; this scheme protects the heat pump system from damage due to this fault, but does not respond to this fault unless the temperatures of the indoor and outdoor heat exchangers are high enough to cause an extreme rise in said discharge refrigerant pressure, and furthermore, this scheme does not protect against wasted energy resulting when this fault occurs under circumstances which do not produce excessive discharge refrigerant pressures.

An object of the present invention is to provide a new and significantly improved means of responding to the conditions of a reverse cycle refrigeration system is heating when it should be cooling or cooling when it should be heating.

SUMMARY OF THE INVENTION

The present invention is an improper operational mode fault detection and control system for a reverse cycle refrigeration system comprising the usual refrigeration compression means, indoor coil, outdoor coil, refrigerant conduit means connecting the compression means and the coils, and refrigerant compression control means. In particular, the improper operational mode fault detection and control system comprises outdoor air temperature sensing means having an output indicative of outdoor air temperature, outdoor heat exchanger coil sensing means having an output indicative of the temperature of the refrigerant in the outdoor heat exchanger coil, building temperature sensing means having a first output indicative of a demand for either heating or cooling of the building when the reverse cycle refrigeration system is operative, and a second output indicative of a demand for operation of the reverse cycle refrigeration system and a special controller means. The special controller means has operative connections to the above recited temperature sensing means so as to receive the outputs thereof. The controller means further includes a circuit connection-disconnection means for selectively interconnecting the building temperature sensing means to the refrigerant compression control means, the building temperature sensing means output normally being connected to the refrigerant compression control means so as to cause the compressor to run or operate whenever there is a demand for heating or cooling of the building. The controller means further is characterized by being adapted to inhibit the operation of the compressor means for either of two situations. The first is when the first output of the building temperature sensing means indicates a demand for heating, the second output of the building temperature sensing means indicates a demand for operation of the compressor, and, after a predetermined time, the value of the outdoor heat exchanger temperature exceeds the outdoor air temperature by a predetermined amount. The second situation is when the first output of the building temperature sensing means indicates a demand for cooling, the second output of the building temperature sensing means indicates a demand for operation of the compressor, and, after a predetermined time, the value of the outdoor heat exchanger temperature is less than the outdoor air temperature by a predetermined amount.

DESCRIPTION OF THE PREFERRED EMBODIMENT

Figure 1:
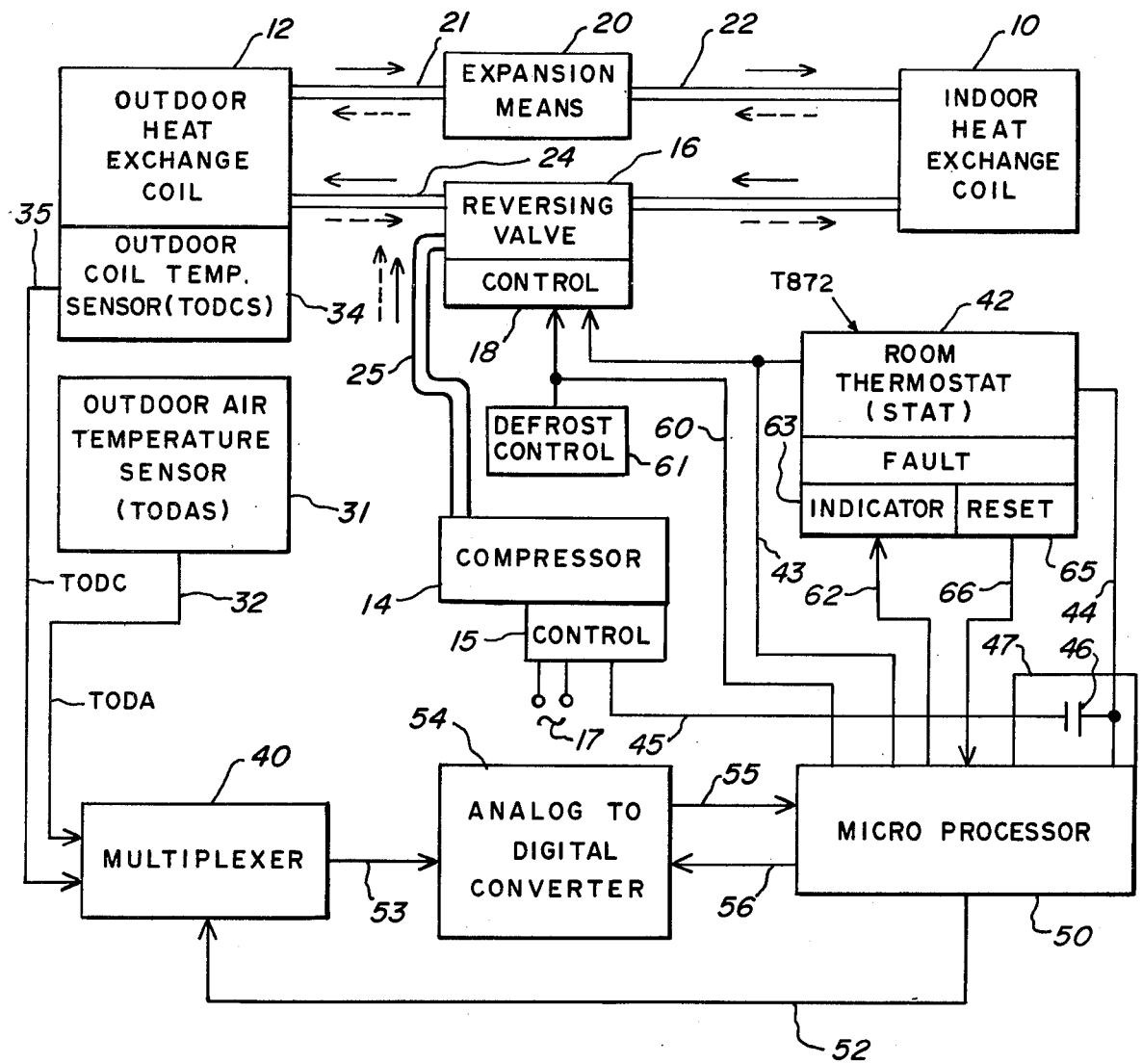
FIG. 1 is a block diagram of a compressor fault detection and control system for a reverse cycle refrigeration system embodying the present invention.

Referring to FIG. 1, the reverse cycle refrigeration system comprises an indoor heat exchange coil 10, an outdoor heat exchange coil 12, a refrigerant compression means or compressor 14, a compressor controller 15 receiving energization from an appropriate source 17 of electrical energy, and refrigerant conduit means interconnecting the coils and compressor, the conduit means including the usual reversing valve 16 having a controller 18, an expansion means 20, and appropriate interconnecting piping 21–26. The system above described is representative of prior art systems such as that shown in the U.S. Pat. No. 3,170,304. As is well known, such systems function whenever the building thermostat is calling for heating or cooling to cause the compressor 14 to operate. If heating is being demanded, then the compressed hot refrigerant from the compressor 14 will be routed through the reversing valve 16 toward the indoor heat exchange coil 10 where its heat is given up to heat indoor air. Conversely, if cooling of the building is being demanded, then the hot refrigerant from the compressor is routed through the reversing valve to the outdoor heat exchange coil where the refrigerant is cooled for subsequent use indoors to cool the building.

The improper operational mode fault detection and control system as depicted in FIG. 1 comprises an outdoor air temperature sensing means 31 (hereinafter sometimes referred to as "TODAS") having an output 32 on which is an output signal indicative of the outdoor air temperature (hereinafter sometimes referred to as "TODA"). TODA on 32 comprises one of two inputs to a multiplexer 40 to be described in more detail below.

The improper operational mode fault detection and control system further comprises an outdoor heat exchanger coil temperature sensing means (hereinafter sometimes referred to as "TODCS") 34 having an output 35 on which is available an output signal indicative of the temperature of the refrigerant in the outdoor heat exchanger coil 12, said temperature hereinafter sometimes being referred to as "TODC"; further, the TODC signal 35 comprises the second input to multiplexer 40. The detection and control system further includes a room thermostat 42 (hereinafter sometimes referred to as "STAT") which responds to the temperature of a room or space in a building or the like, the temperature of which is to be controlled by the reverse cycle refrigeration system. Room thermostat 42 is depicted as having a first output 43 connected to the control 18 for the reversing valve 16 and to a microprocessor 50, and a second output 44 connected to microprocessor 50 and also (through a set of contacts 46 and a connection means 45) to the controller 15 of compressor 14. Contacts 46 are contained within a subsection 47 of the microprocessor 50 and both 47 and 50 will be described in more detail below.

A Honeywell Inc. Model T872 heating-cooling thermostat may be used for the room thermostat 42 depicted in FIG. 1, the Model T872 being of the bimetal operated mercury switch type including switch means for providing the heating-cooling control signals and also for controlling a plurality of auxiliary heating means. As will be understood, whenever STAT 42 calls for either heating or cooling of the controlled space, then a control signal is effectively supplied on outputs 43 and 44 thereof, the control signal at 43 functioning to position via control 18 the reversing valve 16 to the proper orientation for either heating or cooling of the building and to advise microprocessor 50 that the heating mode or the cooling mode has been selected by the STAT 42. The control signal at 44 is transmitted through the normally closed contacts 46 and connection 45 to control the compressor 14 from a rest or "off" position to an operating or "on" condition and is also applied to microprocessor 50 to indicate a demand for compressor 14 operation. The Honeywell Model T872 STAT further includes a fault indicator 63 and a fault reset means 65; e.g., a switch, both of which will be described in further detail below. For convenience, elements 42, 63 and 65 as above described are shown adjacent to one another in FIG. 1, all having the common designator T872.

Also depicted in FIG. 1 is a defrost control 61; this is an apparatus for periodically melting accumulated frost on the outdoor coil. One type of defrost control system that may be used is that disclosed in the applicants' copending application Ser. No. 954,141, filed Oct. 24, 1978; consistent therewith, the microprocessor 50 has an output 60 connected both to the defrost control 61 and the controller 18 for the reversing valve 16. When the microprocessor 50 is calling for defrost action, then an appropriate control signal will appear at 60.

Further, Honeywell Inc. platinum film resistance type temperature sensors models C800A and C800C may be used for TODAS 31 and TODCS 34 respectively. Also, a Westinghouse Inc. HI-RE-LI unit comprising an outdoor unit model no. HL036COW and indoor unit AG012HOK may be used for the basic heat pump unit depicted in FIG. 1; i.e., components 10, 12, 14, 15, and 16.

As indicated above, multiplexer 40 has applied thereto at 32 and 35 analog signals representative of TODA and TODC respectively. The function of the multiplexer 40 is to supply one or the other of the two input signals in analog form to the output 53 thereof, depending upon the nature of the control signal being applied to the multiplexer 40 via a lead 52 from the microprocessor 50; i.e., the microprocessor provides a control for the multiplexer 40 to select which of the two input signals is applied to output 53. Output 53 is applied as the input to a standard analog-to-digital converter 54 (herein sometimes referred to as "A/D") having an output 55 connnected as a second input to the microprocessor 50 and also having an input 56 for receiving controlling instructions from the microprocessor 50. The output from analog-to-digital converter 54 at output 55 is a signal in digital form indicative of the analog signal applied to input 53. The microprocessor 50 has an output 62 connected to a fault indicator 63. The apparatus further includes the above-mentioned fault reset means 65 having an output 66 which constitutes a third input to the microprocessor 50.

A suitable microprocessor that may be used in the present invention as a component of the system depicted in FIG. 1 is the Intel Corporation Model 8049; a suitable representative analog-to-digital converter for use to provide the function of block 54 in FIG. 1 is the Texas Instrument Inc. Model TL505C (see TI Bulletin DL-S 12580); and an appropriate multiplexer is the Motorola Inc. Model MC14051BP.

It will be understood by those skilled in the art that the functional interconnections depicted in FIG. 1 are representative of one or more electrical wires or pipes, as the case may be, as dictated by the specific equipment used.

The detailed operation of the compressor fault detection and control system of FIG. 1 may be more specifically understood by reference to the flowcharts depicted in FIG. 2.

Figure 2A:
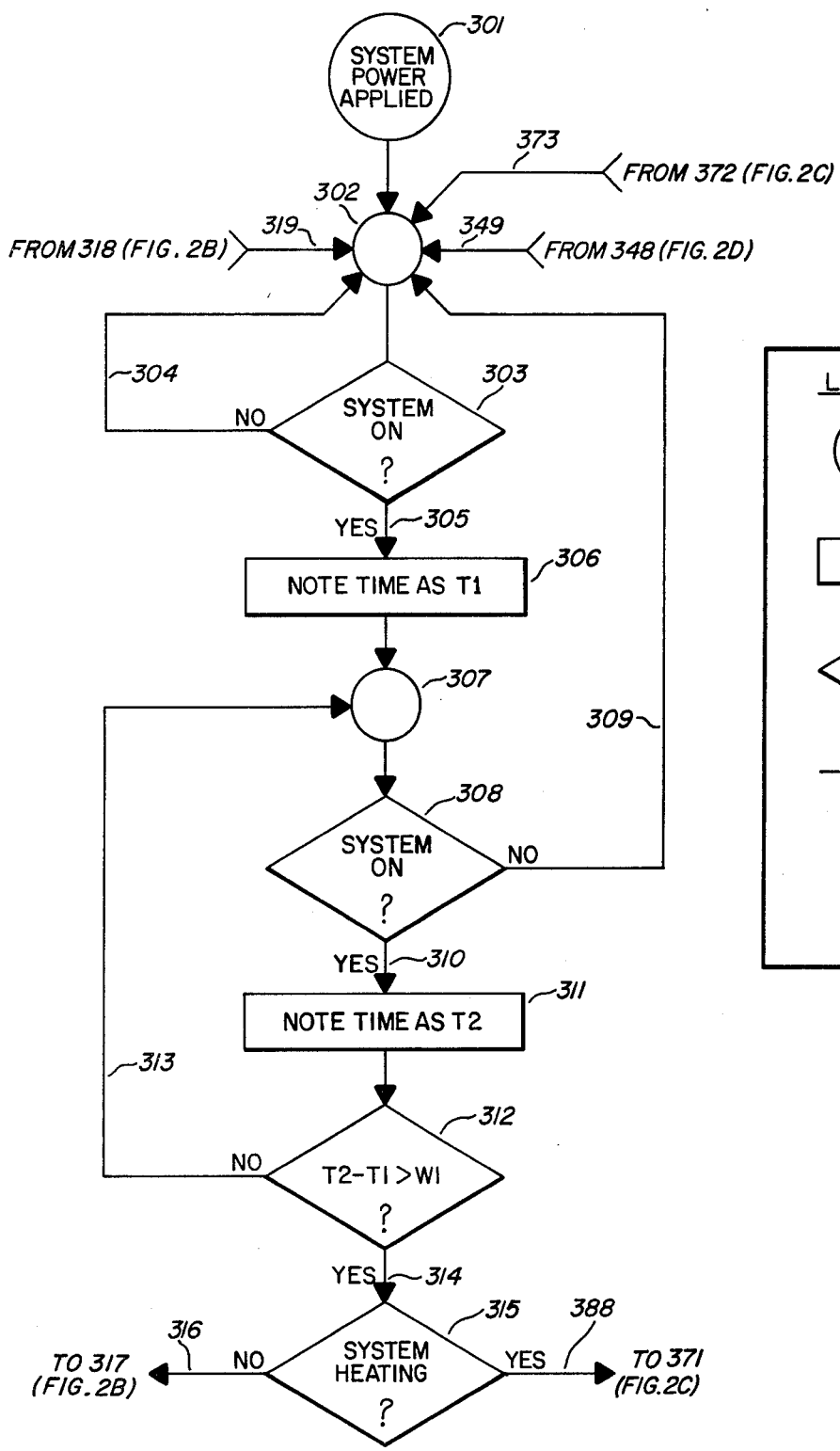
FIGS. 2A, 2B, 2C, and 2D comprise flowcharts for the control of the apparatus shown in FIG. 1.
Figure 2B:
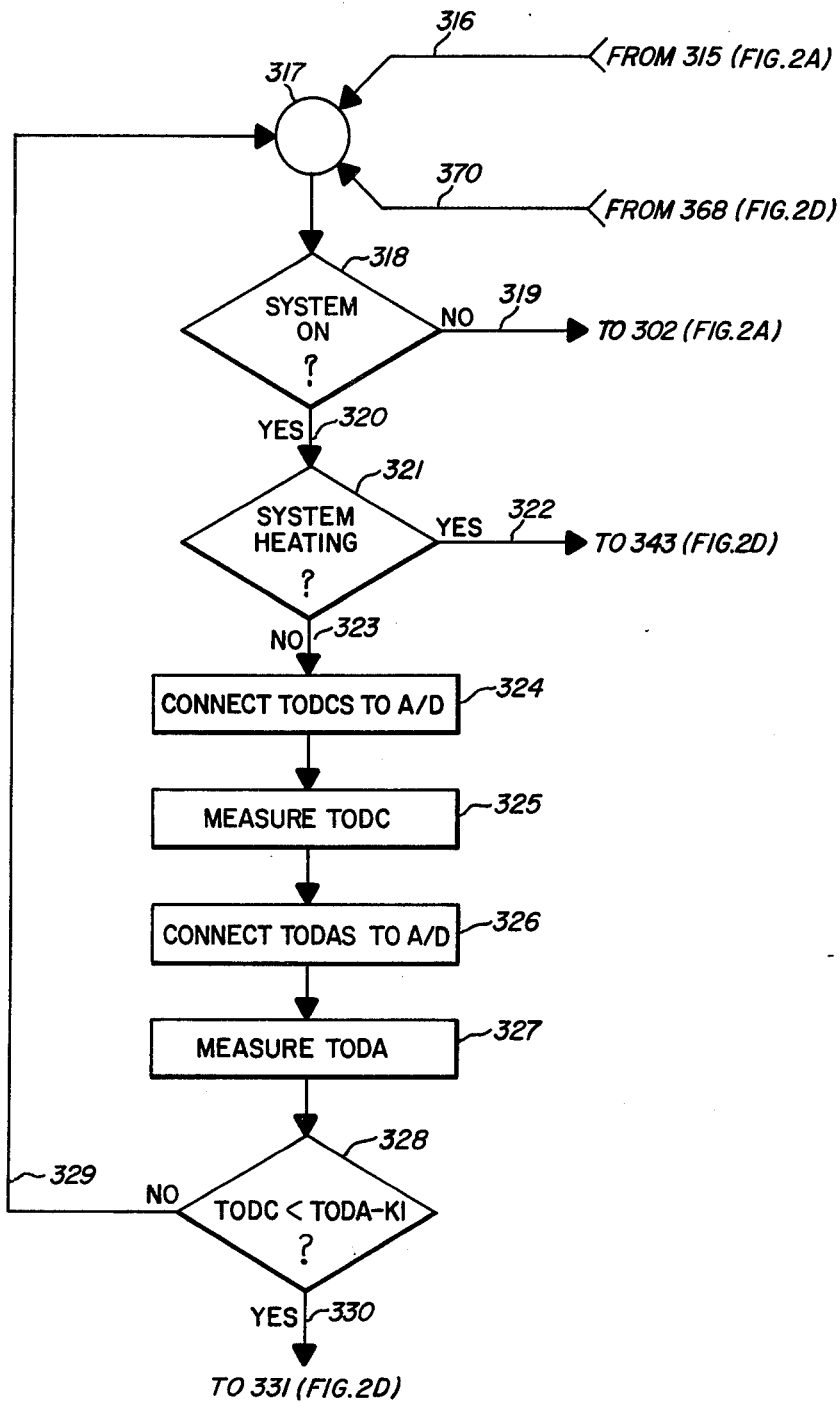
Figure 2C:
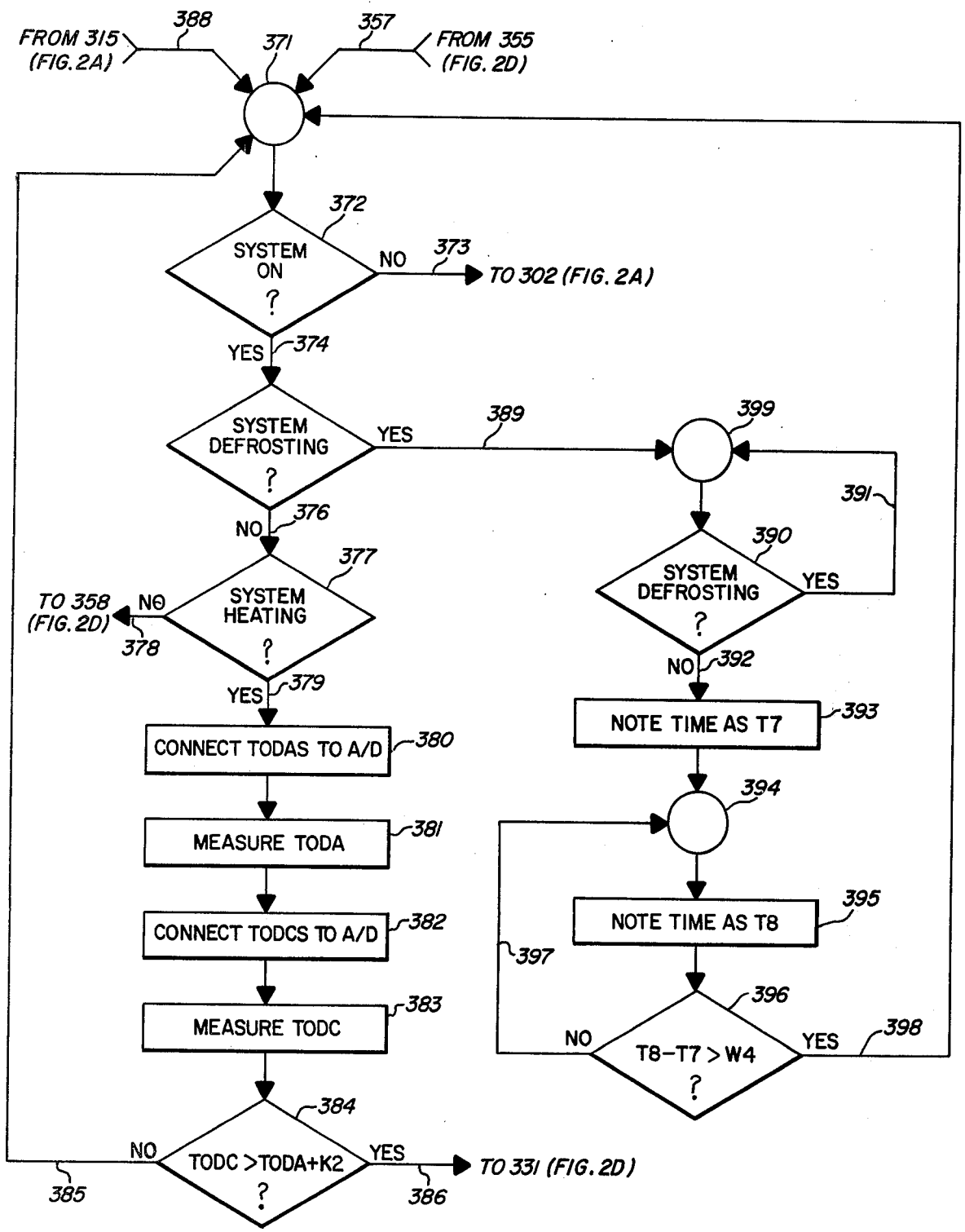
Figure 2D:
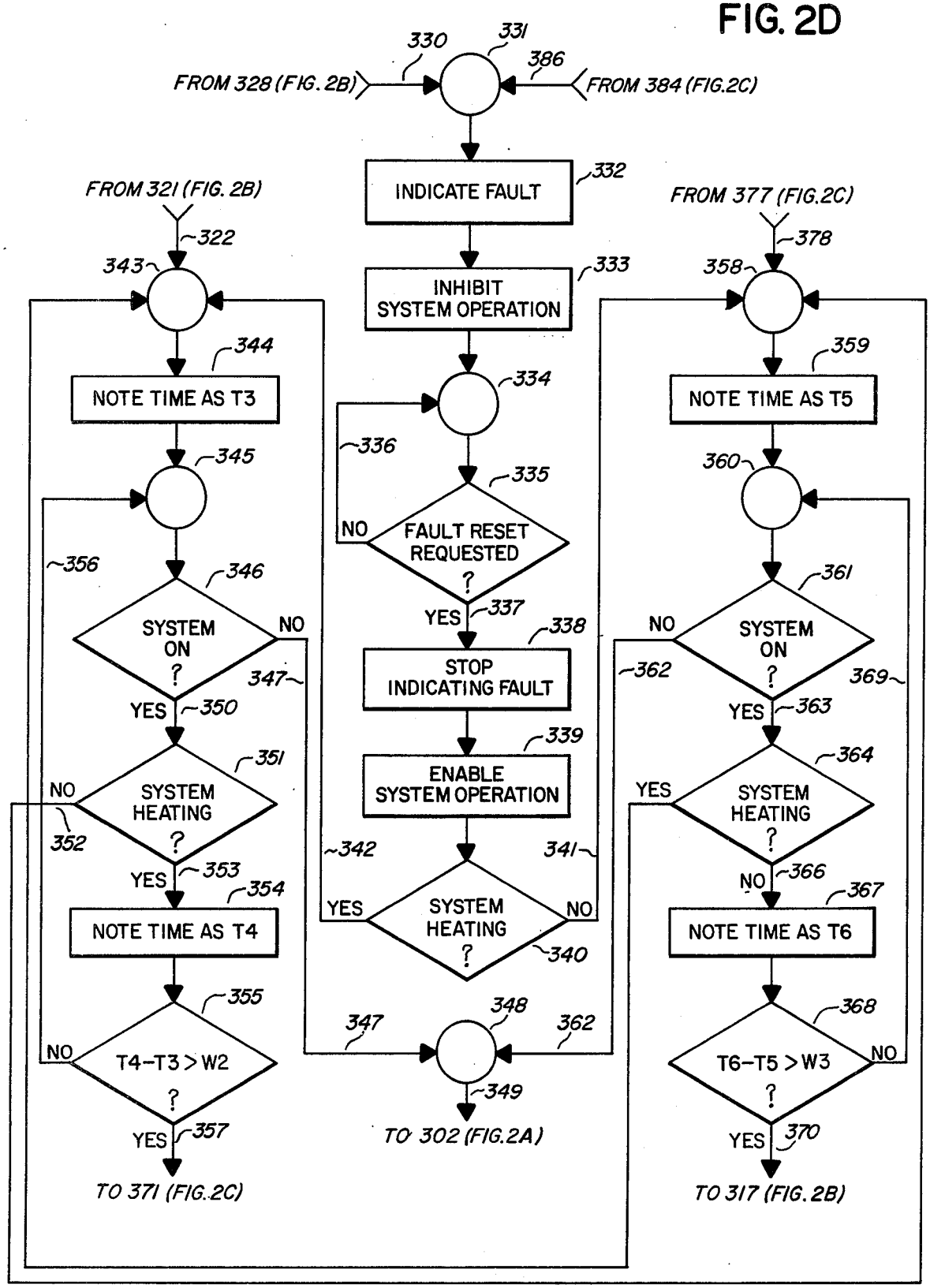

Referring to FIG. 2A, an entry point 301 "System power applied" reflects the status of the heat pump being powered up; i.e., power 17 being applied to compressor controller 15 and to any required control system electrical energization also being supplied. The system then flows via junction 302 to logic instruction 303 "System On?" which branches based on the status of the signal 44 from the STAT 42, to which a "yes" response 305 indicates a demand from the STAT 42 for compressor 14 operation and a "no" response 304 indicates no such demand. The "no" response 304 causes flow via junction 302 and back to 303 which consists of a sequence of operations for waiting until the system is "on". When STAT 42 demands compressor operation, the "yes" response 305 causes flow to an instruction 305 "Note time as T1", which marks the initiation of a timer to delay until the system operation is stable, and thence via junction 307 to logical instruction block 308 "system on?", a "no" response 309 from which branches or causes flow via junction 302 to waiting logical instruction 303.

A "yes" response 310 from logical instruction 308 causes a branch to instruction 311 "Note time as T2" and thence to logical instruction 312 "Is T2 minus T1 greater than W1?" which compares time interval T2-T1 with a preselected minimum period W1, for which a "no" response 313 causes a branch via junction 307 to logical instruction 308 which continues the time delay, and for which a "yes" response 314, indicating the end of the delay period, causes a branch to logical instruction 315 "system heating?", which is a test of the output 43 of room thermostat 42 which indicates whether heating or cooling is demanded, a "no" response 316, indicating the cooling mode, therefrom which branches via junction 317 to logical instruction 318 "system on?", a no response 319 from which branches via junction 302 to waiting logical instruction 303, and a "yes" response 320 therefrom causing flow to logical instruction 321 "system heating?", a "no" response 323 therefrom, indicating a demand for cooling, causes a branch to instruction 324 "connect TODCS to A/D" thence to instruction 325 "measure TODC," thence instruction 326"connect TODAS to A/D", thence to instruction 327 "measure TODA", all of which measure TODA and TODC for the next logical instruction 328 "TODC<TODA−$K_1$?" which compares the two temperatures to verify that the refrigeration system is not operating in the cooling mode, whereby a "no" response 329 verifies correct mode operation and causes the mode of operation to be tested again by branching via junction 317 to logical instruction 318, and a "yes" response 330 indicates that the refrigeration system is operating in the heating mode while the thermostat 42 is demanding cooling, a fault situation which causes flow via junction 331 and a connection 387 to instruction 332 "indicate fault" which causes the microprocessor 50 to provide an output signal on 62 to fault indicator 63, and thence to instruction 333 "inhibit system operation," which opens contacts 46 which prevents room thermostat 42 from providing an operation signal 44 from passing via line 45 to compressor controller 15 which in turn prevents compressor 14 from operating. Flow from instruction 333 via junction 334 to logical instruction 335 "fault reset requested?" tests the fault reset mechanism 65 via microprocessor input 66 for a signal to return to normal operation, from which a "no" response 336 indicating no reset signal, causes a branch via junction 334 back to logical instruction 335 to wait for a reset signal. Once a reset signal is present then a "yes" response 337 of 335 causes a branch to instruction 338 "stop indicating fault" which negates the signal set at instruction 332, and thence to instruction 339 "enable system operation", which reconnects thermostat signal 44 to compressor controller input 45 via contact 46, and thence to logical instruction 340 "system heating?", a "yes" response 342 from which causes a branch via junction 343 to instruction 344, explained below, and a "no" response 341 causes a branch via junction 358 to instruction 359.

The mode testing and fault indicating operations for the cooling mode, beginning with instruction 324 are not tested if the system is switched from cooling to heating before execution of logical instruction 321 "system heating?", a "yes" response 322 indicating a change to the heating mode and causing a branch via junction 343 to instruction 344 "note time as T3" initiating a timer of duration W2 to allow the system to stabilize in the heating mode before testing for correct mode operation, and thence to logic instruction 346 "system on?", to which a "no" response 347 causes a branch via junctions 348 and 302 to waiting logical instruction 303, and a "yes" response 350 causes a branch to logical instruction 351 "system heating?", to which a "no" response 352 causes a branch via junction 358 to instruction 359, described below, and to which a "yes" response 353 branches to instruction 354 "note time as T4" and thence to logical instruction 355 "T4 minus T3 is greater than W2?" which tests for the end of the time interval for the heating mode to stabilize, to which a "no" response 356 causes a branch via junction 345 to logical instruction 346 to continue the time delay, and to which a "yes" response 357 indicates the end of the stabilizing time delay and causes a branch via junction 371 to logical instruction 372 "system on?".

Logical instruction 372 is the start of the test for proper operation of the heating mode, which is the equivalent for the heating mode of logical instruction 318 for the cooling mode. Logical instruction 372 is branched to via junction 371 which combines branches from (i) a "yes" response 388 from logical instruction 315 after the system goes from off to on, (ii) a "yes" response 357 from logical instruction 355 after the system stabilizes from a switch from cooling to heating modes, (iii) a "yes" response 398 from logical instruction 396 "T8 minus T7 is greater than W4" as is described below, and (iv) a "no" response from logical instruction 384 "TODC>TODA+$K_2$?" also to be described below.

A "no" response 373 from logical instruction 372 "system on?" causes a branch via junction 302 to waiting logical instruction 303, and a "yes" response 374 causes a branch to logical instruction 375 "system defrosting?" which tests the signal 60 from the defrost control 61, from which a "yes" response 389 causes a branch via junction 399 to logical instruction 390 "system defrosting?" to which a "yes" response 391 causes a branch back to logical instruction 390 via junction 399 to wait until a "no" response 392 causes a branch to instruction 393 "note time as T7" which initializes a timer to delay operational mode testing for a period W4 until the system stabilizes after defrosting, said timer continuing via branch 394 to instruction 395 "note time as T8" and thence to logical instruction 396 "T8-T7>W4?" which tests for the end of the time period, and to which a "no" response 397 causes a branch via junction 394 to instruction 395 to continue operation in a loop until the end of the time period, and to which a "yes" response 398 causes a branch via junction 371 to logical instruction 372, the start of the heating mode test.

Returning to logical instruction 375 "system defrosting?", a "no" response 376 causes a branch to logical instruction 377 "system heating", to which a "yes" response 379 causes a branch to instruction 380 "connect TODAS to A/D", thence to instruction 381 "measure TODA", thence to instruction 382 "connect TODCS to A/D", then to instruction 383 "measure TODC", all of which operate similar to instructions 324–328 to measure TODA and TODC, and thence to logical instruction 384 "TODC>TODA+$K_2$," which checks for a temperature difference TODC-TODA indicative of the system being in the cooling mode when heating is commanded, a "yes" response 386, corresponding to a fault, causing a branch via junction 331 and 387 to instruction 332 to react to the fault condition, and a "no" response 385, indicating proper operation, causing a branch via junction 371 to logical instruction 372 to repeat the test.

Returning to logical instruction 377 "system heating?", a "no" response 378, indicating a change from the heating mode to the cooling mode, causes a branch via junction 358 to instruction 359 "note time as T5", which initializes a timer of duration W3 which delays testing until the system stabilizes in the cooling mode, and thence via junction 360 to logical instruction 361 "system on?", to which a "no" response 362 causes a branch via junctions 348, 349 and 302 to waiting logical instruction 303, and a "yes" response 363 causes a branch to logical instruction 364 "system heating?" to which a "yes" response 365 causes a branch to the start of the timer of a period of length W3 from cooling to heating via junction 343 to instruction 344, and to which a "no" response 366 causes a branch to instruction 367 "note time as T6" and thence to logical instruction 368 "T6-T5>W3?", which tests for the end of the time delay, to which a "no" response 369 causes a branch via junction 360 to logical instruction 361 to continue the delay, and to which a "yes" response 370 causes a branch via junction 317 to logical instruction 318, which is the start of the cooling mode test.

To summarize, it is seen that the apparatus depicted in FIGS. 1 and 2 are representative of the operation of a heat pump improper mode of operation detection and control system (through the primary control of the microprocessor 50) to determine whether the heat pump system is operating in the heating or cooling mode during a demand for operation in either the heating or cooling mode. Thus, when the STAT is demanding heating, the compressor of the heat pump is inhibited from operating when TODC is greater than TODA by a predetermined amount; a representative difference would be 10° F. or 5.5° C. Further, when the STAT is calling for the cooling mode, the compressor will be inhibited when TODC is less than TODA by a predetermined amount; again, a representative difference would be 10° F. or 5.5° C.

As indicated above, an Intel Model 8049 microprocessor may be used to practice the subject invention; as an assistance, reference may be made to "INTEL$^R$ MCS-48$^{TM}$ Family of Single Chip Microcomputers—User's Manual", a 1978 copyrighted manual of the Intel Corporation, Santa Clara, Calif. 95051. As a further assistance, Appendix A hereto and forming a part hereof, comprises a table of machine readable instruction for controlling the aforesaid Intel Model 8049 microprocessor for use in the present invention.

While we have described a preferred embodiment of our invention, it will be understood that the invention is limited only by the scope of the following claims:

We claim:

1. A wrong operational mode detector and control system (hereinafter "control system") for a reverse cycle refrigeration system (hereinafter "system") for heating and cooling a building wherein said system comprises refrigerant compression means, an indoor coil, an outdoor coil, and refrigerant conduit means connecting said compression means and said coils, said control system comprising:

outdoor air temperature sensing means (hereinafter "TODAS") having an output indicative of outdoor air temperature (hereinafter "TODA");

outdoor coil temperature sensing means (hereinafter "TODCS") having an output indicative of the temperature of said outdoor coil (hereinafter "TODC");

building temperature sensing means (hereinafter "STAT") having outputs indicative of demands for heating and cooling of said building; and means connecting said STAT outputs to said refrigerant compression means so as to cause operation thereof upon said demands for heating and cooling; and controlling means having operative connections to said TODAS, TODC, and STAT so as to receive the outputs thereof and to said refrigerant compression means so as to selectively control the operation of said refrigerant compression means, said controller means being effective to inhibit the operation of said refrigerant compression means as controlled by said STAT upon the following conditions being satisfied:
(1) STAT demanding heating, and
(2) TODC is greater than TODA by a predetermined amount.

2. A wrong operational mode detector and control system (hereinafter "control system") for a reverse cycle refrigeration system (hereinafter "system") for heating and cooling a building wherein said system comprises refrigerant compression means, an indoor coil, an outdoor coil, and refrigerant conduit means connecting said compression means and said coils, said control system comprising:

outdoor air temperature sensing means (hereinafter "TODAS") having an output indicative of outdoor air temperature (hereinafter "TODA");

outdoor coil temperature sensing means (hereinafter "TODCS") having an output indicative of the temperature of said outdoor coil (hereinafter "TODC");

building temperature sensing means (hereinafter "STAT") having outputs indicative of demands for heating and cooling of said building; and means connecting said STAT outputs to said refrigerant compression means so as to cause operation thereof upon said demands for heating and cooling; and controller means having operative connections to said TODAS, TODC, and STAT so as to receive the outputs thereof and to said refrigerant compression means so as to selectively control the operation of said refrigerant compression means, said controller means being effective to inhibit the operation of said refrigerant compression means as controlled by said STAT upon the following conditions being satisfied:
(1) STAT demanding cooling; and
(2) TODC is less than TODA by a predetermined amount.

3. A wrong operational mode detector and control system (hereinafter "control system") for a reverse cycle refrigeration system (hereinafter "system") for heating and cooling a building wherein said system comprises refrigerant compression means, an indoor coil, an outdoor coil, and refrigerant conduit means connecting said compression means and said coils, said control system comprising:

outdoor air temperature sensing means (hereinafter "TODAS") having an output indicative of outdoor air temperature (hereinafter "TODA");

outdoor coil temperature sensing means (hereinafter "TODCS") having an output indicative of the temperature of said outdoor coil (hereinafter "TODC");

building temperature sensing means (hereinafter "STAT") having outputs indicative of demands for heating and cooling of said building; and means connecting said STAT outputs to said refrigerant compression means so as to cause operation thereof upon said demands for heating and cooling; and controller means having operative connections to said TODAS, TODC, and STAT so as to receive the outputs thereof and to said means connecting said STAT outputs to said refrigerant compression means so as to selectively control the operation of said refrigerant compression means, said controller means being effective to disconnect said STAT outputs from said refrigerant compression means to thus inhibit the operation of said refrigerant compression means upon the following conditions being satisfied:

(1) STAT demanding heating, and
(2) TODC is greater than TODA by a predetermined amount.

4. Apparatus of claim 3 further characterized by said controller means also being effective to inhibit the operation of said refrigerant compression means when said STAT is demanding cooling and TODC is less than TODA by a predetermined amount.

5. Apparatus of claim 3 further characterized by said control system including means for placing said system into an outdoor coil defrost mode of operation, and said controller means being inhibited from inhibiting the control of said compression means by said STAT during the time period of said outdoor coil defrost mode of operation plus a subsequent predetermined time period.

6. Apparatus of claim 4 further characterized by said control system including means for placing said system into an outdoor coil defrost mode of operation, and said controller means being inhibited from inhibiting the control of said compression means by said STAT during the time period of said outdoor coil defrost mode of operation plus a subsequent predetermined time period.

* * * * *

UNITED STATES PATENT OFFICE
CERTIFICATE OF CORRECTION

PATENT NO. : 4,211,089

DATED : July 8, 1980

INVENTOR(S) : DALE A. MUELLER & STEPHEN L. SERBER

It is certified that error appears in the above-identified patent and that said Letters Patent are hereby corrected as shown below:

Column 7, line 66, cancel "controlling" and substitute --controller--.

Signed and Sealed this

Twenty-eighth Day of October 1980

[SEAL]

Attest:

SIDNEY A. DIAMOND

Attesting Officer

Commissioner of Patents and Trademarks